Figure 1:
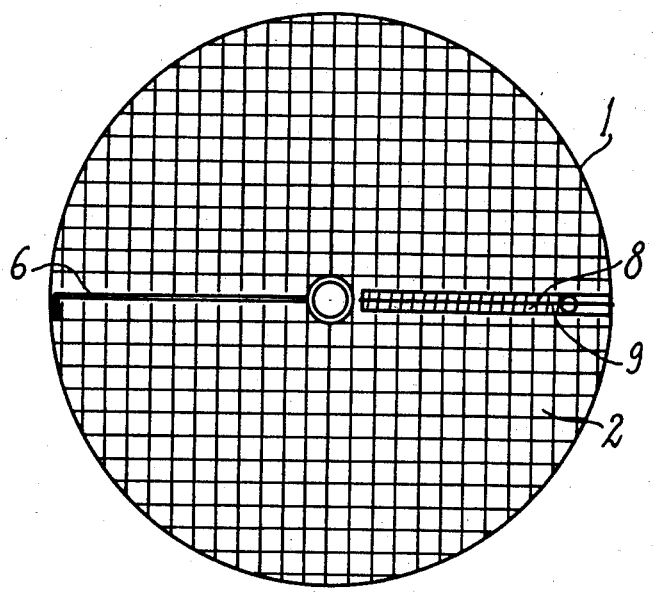

United States Patent [19]

Rovel

[11] 3,828,935
[45] Aug. 13, 1974

[54] DEVICE FOR REMOVING FLOATED MATERIAL IN FLOTATION PROCESSES
[75] Inventor: Jean-Marie Rovel, Versailles, France
[73] Assignee: Degremont Societe Generale D'Epuration et D'Assainissement, Rueil-Malmaison, France
[22] Filed: Apr. 17, 1972
[21] Appl. No.: 244,472

[52] U.S. Cl.............. 210/523, 210/221, 210/540, 209/168
[51] Int. Cl............................................ B01d 12/00
[58] Field of Search......... 210/73, 83, 84, 220, 221, 210/519, 521–523, 525, 538, 540, 42, 44; 209/167–171

[56] References Cited
UNITED STATES PATENTS
3,121,680  2/1964  Ciabattari..................... 210/525 X
3,399,135  8/1968  Conley, Jr. et al. ............. 210/73 X
3,613,889  10/1971 Reed.................................. 210/84
3,640,387  2/1972  Conley et al.................... 210/521 X Primary Examiner—Frank A. Spear, Jr.
Assistant Examiner—Robert H. Spitzer
Attorney, Agent, or Firm—Davis, Hoxie, Faithfull & Hapgood

[57] ABSTRACT

Device for giving a reinforced structure to the cake of floated materials in flotation processes during the operation of removing the floated materials.

The device comprises essentially a grillage of vertical walls inserted in the liquid containing the materials in suspension to be floated.

7 Claims, 5 Drawing Figures

DEVICE FOR REMOVING FLOATED MATERIAL IN FLOTATION PROCESSES

This invention relates to a method of and apparatus for treating liquids to remove materials in suspension, and including a device to be incorporated in an installation for such treatment.

It is well known that, in a floatation installation, the emission into the liquid of gas bubbles of very small dimensions, such as some tens of microns, which become attached to materials, whether flocculated or nonflocculated, present in this liquid, causes the natural ascension of these materials towards the free surface of the liquid, where they regroup, becoming consolidated and forming a "flotation cake." The latter tends to become gradually dehydrated, in contact with the atmospheric air and under the influence of the ascending force of the particles to which the gas bubbles are attached.

In the particular case of the treatment of water, the formation of micro-bubbles can be produced either artificially, for example by depressurising water which has been previously saturated with air under high pressure, say from 3 to 7 bars, or by electrolysis in the case of electroflotation, or naturally due to fermentation, as in the case of materials in suspension naturally floating on untreated waste water or process water.

The floatation cake, constituted by the floating material in the form of concentrated scum, is normally removed by overflowing or skimming.

The removal of the floating materials is carried out by means of known devices which can be simple pusher skimmers having an immersed depth corresponding to the totality or a part of the thickness of the flotation cake. The floating materials pushed by the skimmer are rejected into a collecting hopper. This is the case for surface skimmers rotating above circular floats and for multiple-bladed chain skimmers on longitudinal floats.

These known devices may also consist of rotating spouts, constituted by a folded plate in the form of a (helical screw) spiral rotating about the axis of said (helical screw) spiral, and placed at the level of the floatation cake. when the spout turns, a slice of the top of the floatation cake becomes torn off and slides more and more closely, either towards the central part, or towards one of the extremities of this spout, depending upon the slope of the latter and the inclination of its attacking edge.

The disadvantage of these known devices is that the passage of the skimmer, whatever its type may be, disturbs the lower layers of the flotation cake. This is due to the fact that the floating material possesses weak cohesion and that the flotation cake, more concentrated in its upper part than at its bottom, is in barely stable to unstable equilibrium above the liquid. The passage of the skimmers therefore leads to localised inversion of the floating material, while a part of the absorbed gas is desorbed, thus reducing the buoyancy of the cake, while the bottom layers of the flotation cake, which are the more recent and the thinner, become prematurely in contact with the atmosphere. In certain cases, these perturbations proceed far enough to produce actual gaps in the cake.

This disadvantage is serious, because the concentration of the flotation cake is a direct function of the thickening time of the particles, the ascending thrust of the gas bubbles pushing the lower layers of the flotation cake against the upper, denser layers, thus causing drainage of the interstitial water from the lower layers. Moreover, one of the essential objects of flotation is to concentrate the materials separated from the water to the maximum possible extent, so as to limit the volume of sludges thus produced and the quantity of water which they contain, in order to reduce the cost of their removal (transport, mechanical pressing, incineration, etc.).

In another known installation, the treatment by flotation is carried out in a reservoir of elongated form, fitted with parallel chicanes, mounted perpendicularly to the longitudinal axis of the reservoir, so as always to be below the surface of the material contained in the reservoir. A system of skimmers scums the flotation cake without breaking up this cake, which extends above the upper arris of the chicanes.

The disadvantages of this installation resides in the fact that the chicanes only prevent the perturbation of the floating materials if the coherent layer which forms above these chicanes is not destroyed. For this reason it is impossible to remove the cake of floating materials situated above these chicanes, without seriously perturbing the functioning of the installation.

According to the present invention there is provided a device for the removing of floated materials in a flotation or electroflotation process for materials in suspension in liquids to be treated, comprising a grillage of vertical walls, the entirety of the upper surfaces of said grillage being located in a horizontal plane, and said grillage bounding a large numbers of vertical passages, in use said grillage being inserted into said liquid containing material in suspension, means for controling the hydraulic level of said liquid, collection means mounted in the immediate proximity of said upper surfaces of said grillage, means for moving said collection means to cause said materials in suspension to be removed via said controlling means, and means for mounting said device in the installation for said flotation or electroflotation process.

The network of grillage of vertical walls may with advantage be constituted by a plurality of series of juxtaposed tubes, bounding vertical ducts of circular crossection, or a plurality or series of plates bounding ducts of square, rectangular or hexagonal cross-section in the form of a honeycomb.

The device according to the present invention firstly, permits artificial reinforcement of the cohesion of the flotation cake, and, secondly, vertically guiding the ascending movement of the floating sludges, prevents any transverse displacement.

This artificial cohesion of the floating material, created by the device forming the subject of the invention, permits the formation of flotation cakes of considerable thickness and therefore of producing on the upper layers of these cakes materials which are better dehydrated as a result of a notably increased drainage time.

Another advantage is afforded by the fact that, when the cake is so maintained by the network or grillage of surfaces, only the upper stratum of the driest part of the flotation cake is effectively collected during the skimming operation.

Figure 2:
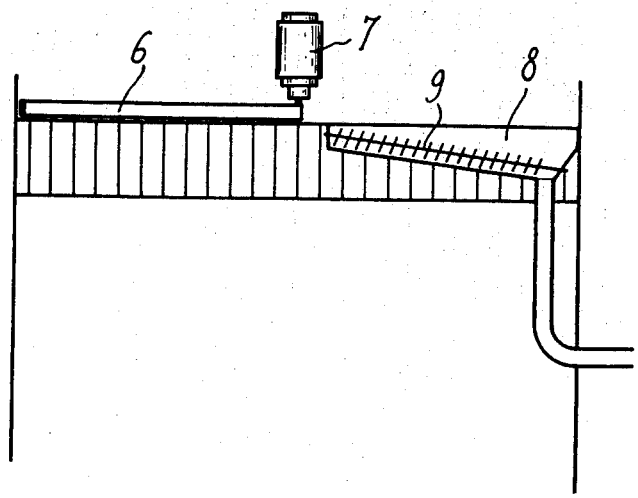
Figure 3:
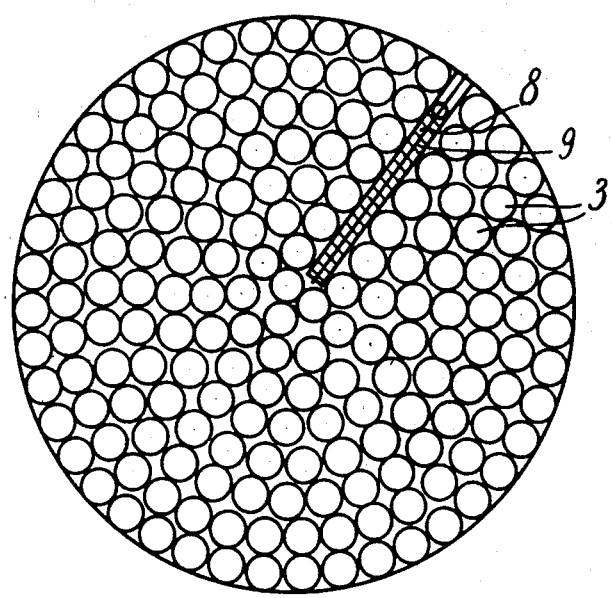
Figure 4:
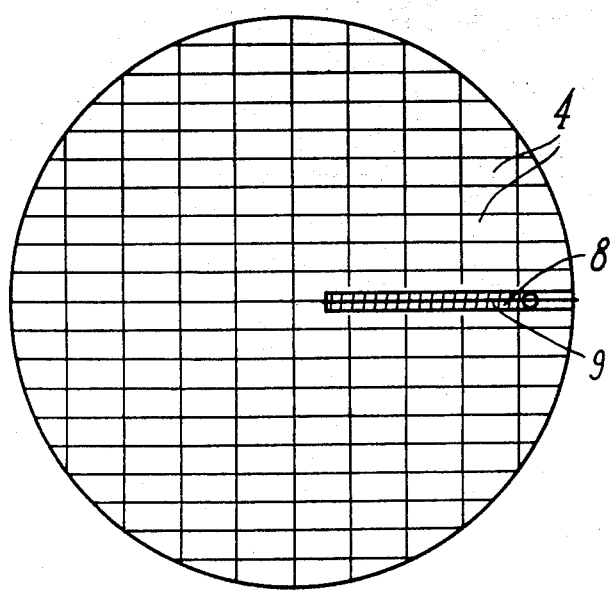
Figure 5:
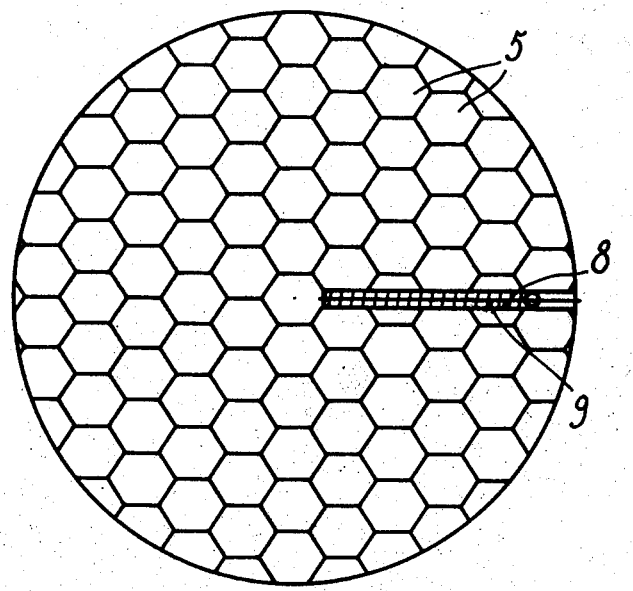

Embodiments of the invention will now be described, by way of example only, with reference to the accompanying drawings, in which:

FIG. 1 is a schematic representation, viewed from above, of an embodiment of a device according to the present invention, of which FIG. 2 is a schematic representation in vertical section, and FIGS. 3, 4 and 5 are schematic representation from above of three alternative embodiments of the device according to the present invention.

Modifications of the illustrated embodiments will become apparent from the description below.

A device incorporated in an installation for treating liquids to remove materials in suspension by separation using a flotation or electroflotation process, shown in FIGS. 1 and 2, comprises a network or grillage of juxtaposed surfaces forming a network of passages 2, disposed within liquid containing floating materials. The installation comprises a float 1 of appropriate cross-section, for exemple circular or rectangular, and which, in the example of embodiment shown, is of circular cross-section.

This network of passages 2 is immersed in the upper part of the float 1 and projects slightly above the free surface of the liquid by several centimetres, for example, with the immersion depth of the order of from one to several tens of centimetres, depending upon the size of the float and the nature of the floating materials, the height of the vertical walls of the network varying from 5 to 30 cm, the depth of the network beneath the liquid hydraulic level varying respectively from 3 to 15 cm for example.

By the term "hydraulic level of the liquid", used in the description and the claims, there is meant the interface between the liquid in which the particles entrained by the air bubbles ascend, and the cake in which the bubbles no longer move, and which grows progressively with the arrival of the particles of floating material.

This level is established (experimentally) by using an overflow spout to keep this interface at a constant level. In effect, the liquid flows freely while the cake rests in place.

The network of passages possesses a configuration adapted to the type of materials to be floated: thus the network may comprise a series of juxtaposed tubes 3 bounding vertical ducts of circular section (see FIG. 3), or it may comprise a series of juxtaposed orthogonal plates 4 bounding vertical ducts of rectangular or square cross-section (see FIG. 4), or again it may comprise a honeycomb assembly of hexagonal cells 5 (see FIG. 5).

The cross-section of the passages possesses a unitary surface which is a function of the materials to be floated; it may lie between 3 and 200 $cm^2$. The portion projecting above the hydraulic level of the liquid enables the floated materials to continue their thickening, even above the liquid surface. The process of thickening by trusting of the lower layers is then favoured by the natural evaporation in contact with the atmospheric air. The floation cake can thus project beyond the hydraulic level by several centimetres.

The device can be mounted in a separation installation in a rigid manner or, preferably, in an adjustable manner. Adjustable mounting possesses numerous advantages, since it enables the device to be adjusted to the desired height as a function of the possible variations of pollution and hydraulic level of the liquid in the installation. The device may also be detachable so that removal facilitates the cleaning of the device and of the installation.

Advantageously, the collecting means comprise skimmers 6 driven by a motor 7, which moves in the immediate proximity of the upper surface of the frame formed by the network of passages. The skimmers carry out a (true) cutting of the flotation cake and thus tend to ensure a perfect removal, continuous and constant in quality and in quantity, of the floated materials (see FIGS. 1 and 2).

These collecting means may also comprise one or more overflow spouts 8, provided with (helical) screws 9 for recovering the floated materials and, advantageously, which are disposed between two ranges of tUbes 3 or of plates 4 or 5, at intervals at the free surface of the float 1 (see FIGS. 1 – 5).

The present invention will now be explained and exemplified by embodiments of the device according to the present invention.

EXAMPLE 1

The water to be treated, issuing from a biological purification installation for urban waste matter, is introduced into an installation for separation by flotation furnished with the device of the invention.

The device used comprises a network of walls of square section, the dimensions of the passages being 100 × 100 mm and their height being 30 cm, and also comprises a rotating skimmer and an overflow spout.

The rotating skimmer ensures the continuous removal of the upper part of the floated materials.

The water to be treated contains from 4 – 5 g/litre of materials in suspension, constituted by activated sludges.

The ascending time for the flotation cake is very fast, that is, 0.4 cm/minute above the hydraulic level, the cake reaching, after 35 – 40 minutes, a depth of 15 cm, the depth of the passage network or grillage being 30 cm.

The total depth reached by the cake is from 65 – 80 cm. The portion projecting above the surface of the network or grillage, constituted by an already well pressed sludge, possessing a solids materials content of 5.1 percent, is continuously removed, that is to say 1 kg of solid materials are obtained from 19.6 kg of sludges.

Using previously known conventional installations, it is not possible to achieve, commencing with a similar starting sludge, a flotation cake more than 20 cm thick, and therefore at best a sludge concentrated to 2.1 percent; since moreover, it is possible to recover only the upper part of the flotation cake, the solids material content scarcely reaches 1.8 percent, that is to say, only 1 kg of dried materials are obtained from 56 kg of sludges.

This example clearly shows the considerable advantage provided by the device forming the subject of the invention, which enables extracted sludges having a concentration 2.85 times greater to be obtained than in conventional installations of known type, which represents a gain in volume, a reduction of transport costs, improved facility in handling and an appreciable reduction in the costs of removal of the flotation cake.

EXAMPLE II

A device according to the invention is used, possessing a depth of 5 cm, the section of the passages being 150 × 150 mm, projecting above the hydraulic level by 3 cm, for treating sludges issuing from the flocculation-decantation of river water by means of ferric chloride containing from 50 to 200 mg/litre of materials in suspension. By surface skimming, floating sludges were collected possessing a concentration of 80 g/litre in dried materials, while still maintaining a very high quality of purified water (2 – 3 units on the international $SiO_2$ scale), whereas in flocculation-decantation installations of known type, not provided with the device according to the invention, it was not possible for the concentration of the sludges removed to exceed 20 g/litre.

It follows from the preceding description, that whatever the process of realisation and application adopted, by using the present devices for guiding floated materials, improved utilisation and improved sludge extraction yield are obtained, in a flotation or electroflotation separation installation for materials in suspension in a liquid.

What I claim is:

1. A device for removing floated materials from a body of liquid in a flotation separation process comprising a tank, a grillage in the upper portion of said tank, a sloping overflow spout having liquid outlet means at its lowest point for maintaining the liquid level in said tank below the upper surface of said grillage, collection means mounted in the immediate proximity of the upper surface of said grillage for moving the upper portion of the floated materials into said overflow spout, and screw conveyor means for moving said floated materials downwardly along said overflow spout to said outlet means.

2. The device claimed in claim 1 wherein said grillage comprises a plurality of juxtaposed tubes defining vertical ducts of circular section.

3. The device claimed in claim 1 wherein said grillage comprises a plurality of juxtaposed orthogonal plates defining vertical ducts of square section.

4. The device claimed in claim 1 wherein said grillage comprises a plurality of juxtaposed orthogonal plates defining vertical ducts of rectangular section.

5. The device claimed in claim 1 wherein said grillage is in the form of a honeycomb formed by a plurality of juxtaposed plates defining vertical ducts of hexagonal section.

6. The device claimed in claim 1 wherein the grillage is secured to the wall of said tank in a non-rigid manner.

7. The device claimed in claim 1 wherein said outlet means comprises an overflow pipe.

* * * * *